Jan. 15, 1952      A. C. RUGE      2,582,851

TRANSIENT ANALYZER

Filed May 1, 1945

Inventor
ARTHUR C. RUGE

By Ralph L. Chappell
Attorney

Patented Jan. 15, 1952

2,582,851

UNITED STATES PATENT OFFICE 2,582,851

TRANSIENT ANALYZER

Arthur C. Ruge, Cambridge, Mass., assignor to the United States of America as represented by the Secretary of the Navy Application May 1, 1945, Serial No. 591,299

5 Claims. (Cl. 175—183)

This invention relates to an instrument for analyzing fast transient phenomena, more particularly without high speed recording.

It is an object of this invention to analyze phenomena, converted to an electrical voltage which is determined across the condenser in series with a resistance and a rectifier for a length of time which is sufficient for measurement of the transient.

It is another object of this invention to provide a cheaper instrument for studying the transient voltage impressed upon an electrical circuit.

Various further objects and advantages of this invention will be understood from the following drawings, in which.

Figure 1:
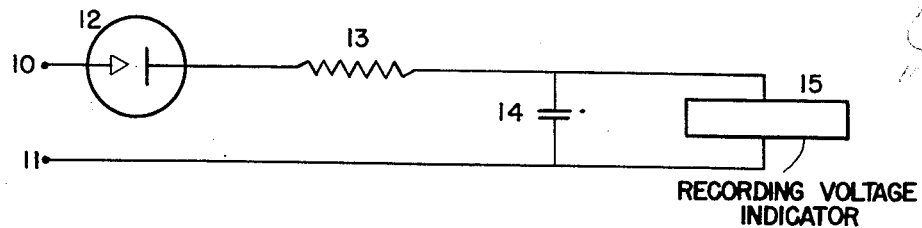
Fig. 1 is a wiring schematic arrangement in accordance with the principles of this invention.

The apparatus of this invention is intended to cheaply measure the value of the transient voltage produced from an electrical strain, sound, etc., impressed upon terminals 10 and 11 of the circuit, as shown in Fig. 1, in which a rectifier 12, a resistance 13 and a condenser 14 are shown connected in series. If the leakage of the condenser 14 is small and the rectifier has a high resistance to reverse flow the charge can be measured across the condenser 14. For visual observation the recorder 15 can be a single sweep cathode ray tube in which the voltage is put on the plate and the spot deflected proportionally to the peak amplitude of the transient. Amplification, if desirable, can be introduced between the condenser 14 and recording cathode ray tube 15. Another form of visual recorder is a vacuum tube voltmeter 15. If the input resistance is too low, additional resistance can be interposed in the circuit in order to permit easier reading. In the alternative, and if a permanent record is also desired, the vacuum tube voltmeter could be photographed with a moderated speed camera. A direct quick acting Brush crystal or Easterline-Angus recorder 15 could also be used, particularly if a large number of readings must be made in a short period of time. In this way, a slow time constant circuit is provided that cheaply augments and records the necessary information that can be evaluated in the light of the known general character of the transient. By combining this knowledge, one can secure a good analysis with the expenditure of a minimum of cost, time and effort.

If the time constant RC is small relative to the duration of the maximum voltage in the transient, the voltage on the condenser at any time will be equal to maximum voltage in the transient up to that time. If the time constant is not small, then condenser voltage will equal maximum transient voltage over a period of time somewhat larger than RC or the integral of the voltage time curve for peaks of duration shorter than about 2 RC whichever is larger. If instead of rectifier 12, a double rectifier such as a duo-diode is used with separate RC circuit both positive and negative peaks can be measured. Also, if several rectifier condenser combinations are operated from one source, peak voltage data at arbitrary chosen time constants can be collected providing considerable analysis of the transient.

Figure 2:
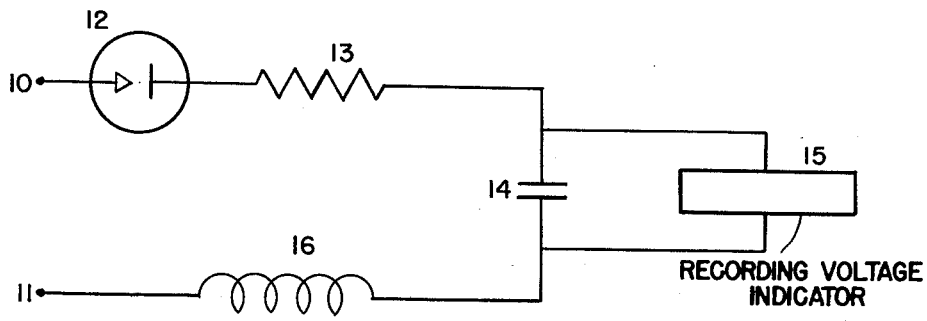
Fig. 2 is a modified version of Fig. 1.
Figure 3:
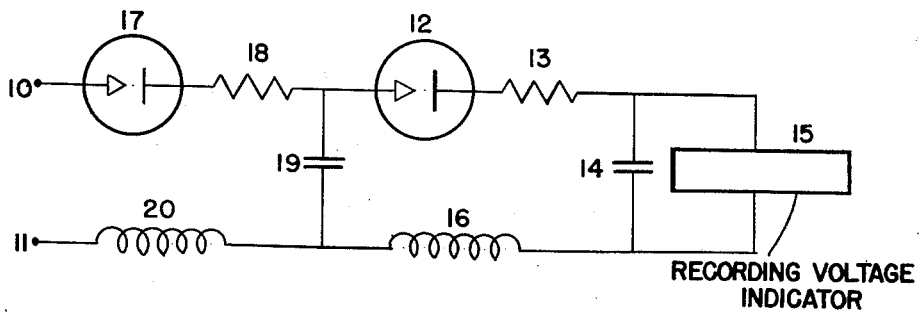
Fig. 3 is a further modification of Fig. 2.

In Fig. 2, impedance 16 has been added as shown, as further control, and in Fig. 3, further control is secured by connecting the circuit of Fig. 2 in series across the condenser of a circuit similar to Fig. 2. In such an arrangement it is possible to omit rectifier 17, but generally rectifier 17 is included along with resistance 18, condenser 19 and impedance 20 which are similar in value to those chosen for Fig. 2.

What is claimed is:

1. In a method for analyzing transient electrical signals the steps of applying said transient electrical signals to a plurality of circuits, each circuit including a resistive element and at least one reactive element including at least one capacitor and a rectifier in series, and measuring the potential across a capacitor in each of said circuits after application of said transient signals.

2. A device for analyzing electrical transients comprising, a plurality of analyzing circuits, each circuit comprising a resistive element, at least one reactive element including at least one capacitor and a rectifier connected in series circuit, the first of said circuits having a time constant of duration substantially shorter than the period of maximum voltage of said transient to be analyzed, the last of said circuits having a time constant of duration substantially longer than the period of the maximum voltage of said transient to be analyzed, the remainder of said plurality of circuits having time constants at intervals between the time constant of said first and last circuits, means for connecting selected ones of said circuits to the source of said electrical transients, and means coupled to said analyzing circuits for individually measuring the potential across a capacitor in each of said selected analyzing circuits.

3. A device for analyzing electrical transients comprising, a plurality of analyzing circuits, each circuit comprising a resistor, a capacitor, an inductor and a rectifier connected in series, each of said circuits having a square wave response characterized by an initial relatively slow rate of rise of potential across said capacitor followed by a relatively rapid rate of rise of potential across said capacitor to the vicinity of the potential of the applied square wave, the first of said circuits having a time interval measured from the initial application of said square wave to the initiation of said rapid rise in potential substantially shorter than the period of maximum voltage of said transient to be analyzed, the last of said circuits having a corresponding time interval substantially longer than the period of maximum voltage of the transient to be analyzed, the remainder of said circuits having time intervals spaced in steps between the time interval of said first circuit and the time interval of said last circuit, means for connecting selected ones of said circuits to the source of said electrical transients, and means coupled to said analyzing circuits for individually measuring the potential across said capacitor in each of said selected analyzing circuits.

4. A device for analyzing electrical transients comprising, in combination, a resistor, a capacitor, an inductor and a rectifier in series, said series circuit having a square wave response characterized by an initial relatively slow rate of rise of potential across said capacitor followed by a relatively rapid rate of rise of potential across said capacitor to the vicinity of the potential of the applied square wave, means for coupling said series circuit to the source of electrical transients and means for measuring the potential across said capacitor following the application of said transients to said series circuit.

5. A device for analyzing electrical transients comprising, in combination, a first circuit including a first resistor, a first capacitor, a first inductor and a first rectifier connected in series, a second circuit including a second resistor, a second capacitor, a second inductor and a second rectifier connected in series, said second circuit being connected in shunt with said first capacitor, each of said circuits having a square wave response characterized by an initial relatively slow rate of rise of potential across the capacitor forming a part thereof followed by a relatively rapid rate of rise of potential across the capacitor to the vicinity of the potential of the applied square wave, means for coupling said first circuit to the source of electrical transients, and means for measuring the potential across said second capacitor following the application of said transients to said first circuit.

ARTHUR C. RUGE.

REFERENCES CITED

The following references are of record in the file of this patent:

UNITED STATES PATENTS

| Number | Name | Date |
|---|---|---|
| 2,139,474 | Shepard | Dec. 6, 1938 |
| 2,147,918 | Overbeck | Feb. 21, 1939 |
| 2,232,856 | Idle | Feb. 25, 1941 |
| 2,332,773 | Barnette et al. | Oct. 26, 1943 |
| 2,439,446 | Begun | Apr. 13, 1948 |

FOREIGN PATENTS

| Number | Country | Date |
|---|---|---|
| 822,228 | France | Sept. 13, 1937 |